Dec. 4, 1945.                J. MAZER                 2,390,262
                       ACOUSTICAL STRUCTURE
                       Filed Aug. 15, 1941           3 Sheets-Sheet 1

INVENTOR.
Jacob Mazer
BY Archworth Martin
His Attorney

Dec. 4, 1945.  J. MAZER  2,390,262
ACOUSTICAL STRUCTURE
Filed Aug. 15, 1941  3 Sheets-Sheet 2

INVENTOR.
Jacob Mazer
BY Archworth Martin
His Attorney

Dec. 4, 1945.  J. MAZER  2,390,262
ACOUSTICAL STRUCTURE
Filed Aug. 15, 1941   3 Sheets-Sheet 3

INVENTOR
Jacob Mazer
By Archworth Martin
His Attorney

Patented Dec. 4, 1945

2,390,262

UNITED STATES PATENT OFFICE 2,390,262

ACOUSTICAL STRUCTURE

Jacob Mazer, Miami Beach, Fla.

Application August 15, 1941, Serial No. 406,986

3 Claims. (Cl. 20—4)

My invention relates to acoustical structures, and more particularly to the type employed on the walls and ceilings interiorly of buildings, for the purpose of absorbing sound.

Briefly stated, the invention in its preferred form comprises the use of what is known as corrugated sheets or boards, of the form frequently employed in the making of cartons or as packing material to protect fragile articles against breakage in handling and shipment.

One object of my invention is to provide a structure of such form that it has acoustical properties not possessed by various types of sound-absorbing materials heretofore employed, and which is capable of effectively absorbing or dampening sound waves of either high pitch or low pitch.

Another object of my invention is to provide a sound-absorbing unit of simple and cheap form, which can readily be installed by unskilled labor.

Still another object of my invention is to provide sound-absorbing units of such form that they can readily be applied to a wall in a generally flatwise position, or which can readily be shaped to form structural-appearing elements such as beams, columns, pilasters and tubes.

A further object is to provide a sound-absorbing unit of such form that it may be hung at various locations in a room, without the necessity of applying it directly against a ceiling surface or a wall surface, and also to provide a unit whose sound-absorbing capacity can readily be altered after it has been installed.

Figure 1:
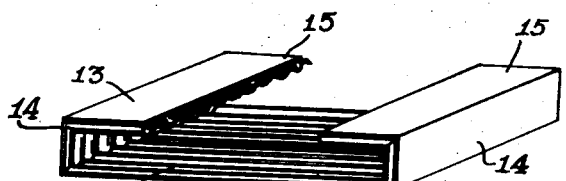
Figure 3:
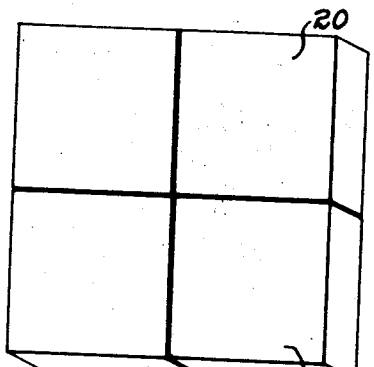
Figure 2:
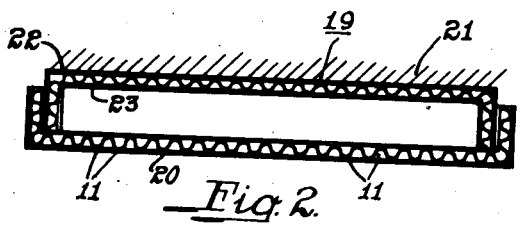
Figure 4:
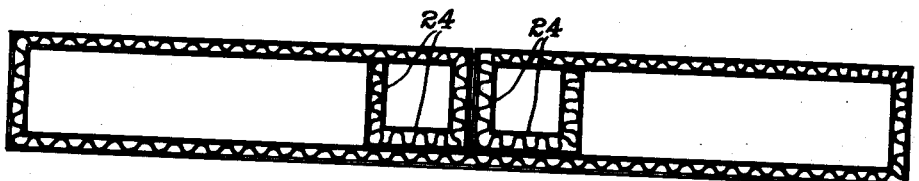
Figure 5:
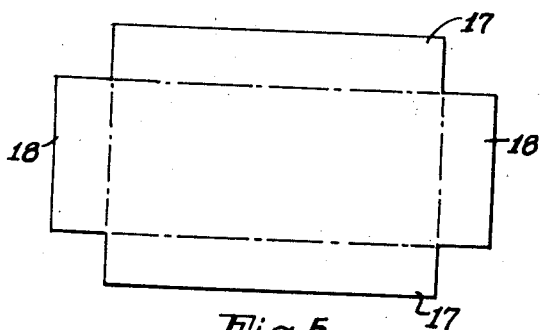
Figure 6:
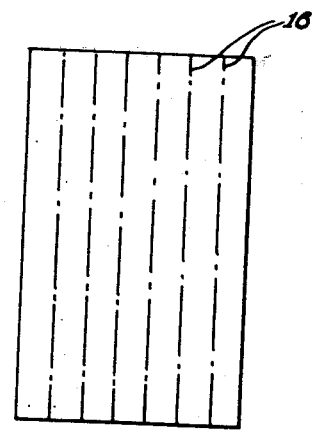
Figure 7:
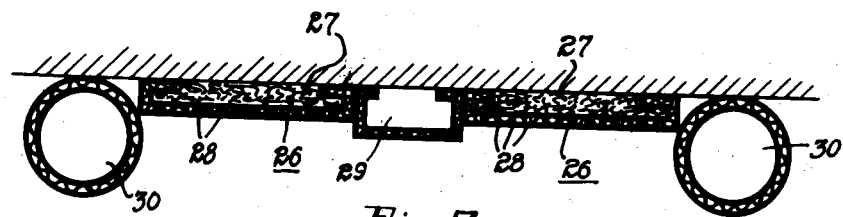
Figure 8:
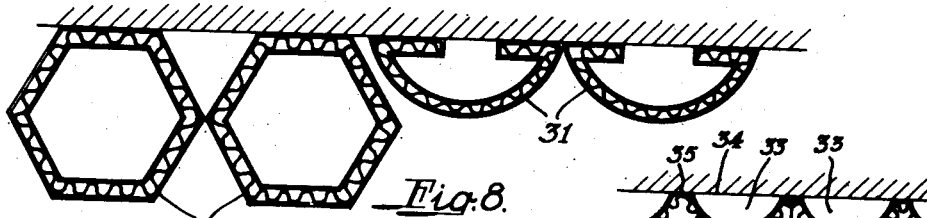
Figure 9:
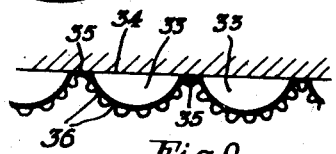
Figure 11:
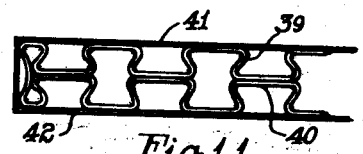
Figure 10:
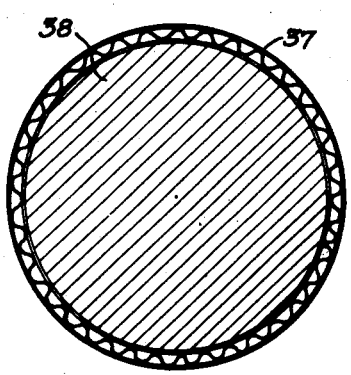
Figure 12:
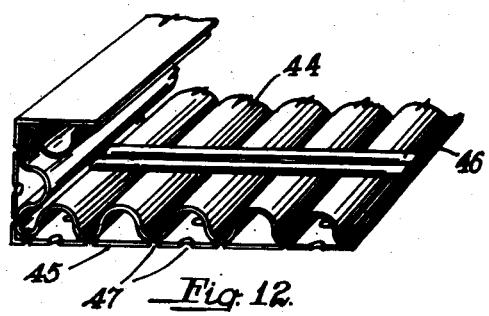
Figure 13:
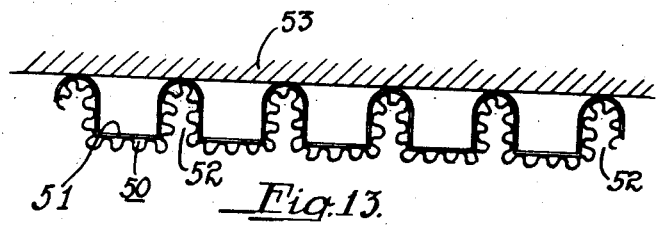
Figure 14:
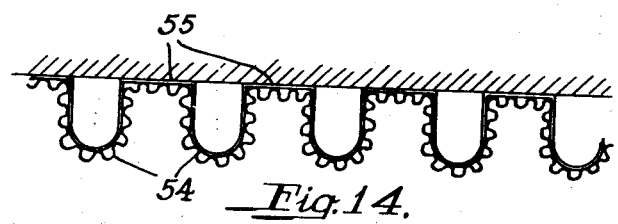
Figure 15:
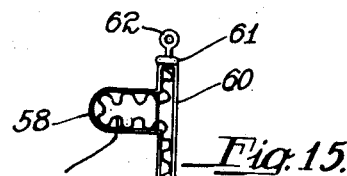
Figure 17:
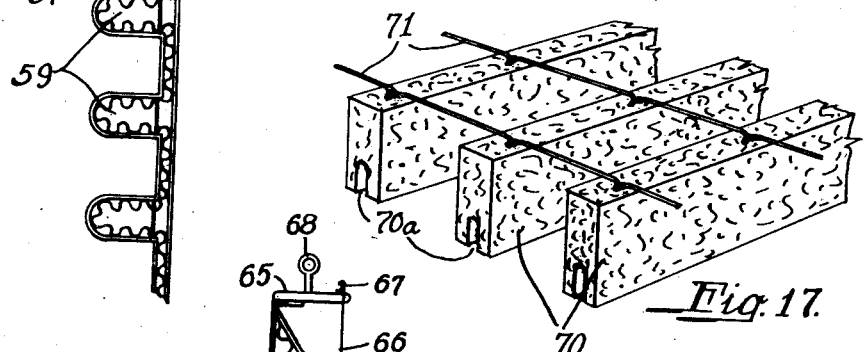
Figure 16:
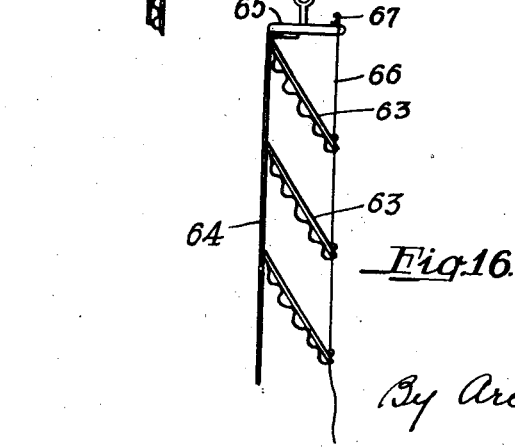

In the accompanying drawings Figure 1 is a perspective view of a unit in its simplest form; Fig. 2 is a sectional view showing a modification of the structure of Fig. 1; Fig. 3 is a view showing a perspective view of a portion of a wall to which a number of the sound-absorbing units are applied; Fig. 4 is a sectional view showing a modification of the structure of Fig. 2; Fig. 5 is a plan view showing a corrugated blank from which a box-like unit can be formed; Fig. 6 is a plan view of a corrugated blank indicating score lines or the like along which bending of the board may be effected, to conveniently produce desired shapes and sizes of sound-absorbing units; Fig. 7 is a sectional view showing some structural shapes to which the corrugated sound-absorbing sheets may be bent; Fig. 8 is a view showing still other shapes; Fig. 9 is a cross-sectional view showing a manner in which a large sheet may be bent to form a single unit that has a plurality of longitudinally-extending areas spaced from the wall; Fig. 10 is a cross-sectional view of a solid column surrounded by a sound-absorbing unit; Fig. 11 is a sectional view showing another form of corrugated sheet or board that may be employed; Fig. 12 shows a further modification of a portion of a unit; Fig. 13 shows a modification of the arrangement of Fig. 9; Fig. 14 shows another shape to which the corrugated board may be bent; Fig. 15 shows an arrangement of a sound-absorbing unit which may be hung at desired locations in a room; Fig. 16 shows a unit containing sound-absorbing elements that may be adjusted to various positions, to effect changes in the degree of sound absorption, and Fig. 17 shows a modification of the structure of Fig. 16.

The corrugated board is preferably of fibrous material having some inherent stiffness, such as the coarse paper or "straw board" commonly employed in the making of cartons, the boards being impregnated with some well-known silicate or other substance that will make it fire-resistant.

As shown in Fig. 1, the board consists of a corrugated sheet 12 that is glued to a smooth facing sheet 13. The edges of the board are bent up as indicated at 14, to form the unit into approximately channel form, the edges being continued inwardly to form wings 15 and said wings 15 being cemented to the ceiling or wall. A sufficient number of these units are placed side-by-side to cover a desired wall or ceiling area. Bending of the units is facilitated by first making score lines thereon as indicated at 16 in Fig. 6, such score lines being made by a blunt pointed tool or stylus, or by impressing an edged strip against the same, so that the lines of bend will be straight and accurately located. A corrugated board of this nature is frequently made in widths up to six feet and of indefinite length. Therefore in some cases strips can be unrolled and cut to lengths that will extend the full length of a room, each strip being bent along longitudinally-extending lines, as indicated in Fig. 1, and installed side-by-side upon a ceiling or wall. The widths of strips employed will depend upon the inherent stiffness of the corrugated board, hence it is desired that they shall not be of such width that the stiffening effect of the corrugations at 12 will be insufficient to prevent sagging. The exposed face of the assembled units can be painted or otherwise decorated or be covered with asbestos paper, ornamental paper, metal foil, cloth or the like.

It will be seen that in preparing the sound-absorbing units, the score lines that facilitate bending of the corrugated board to the desired shape may be made either parallel to or transversely of the corrugations, the unit of Fig. 1 having been formed after scoring the board along lines transversely of the corrugations, and the unit of Fig. 2 and various of the other figures being formed of corrugated board scored longitudinally of the corrugations.

The units have high sound-absorbing value in that not only does the wide-face area between the upturned sides 14 function as a diaphragm, but there are a large number of smaller diaphragm areas on the facing sheet, such smaller areas being those indicated at 11 in Fig. 2, overlying the corrugations.

In Fig. 2 I show a unit composed of two sheets of corrugated board, each formed from a blank such as that shown in Fig. 5, wherein the winglike edge portions 17 and the end portions 18 are bent from the plane of the sheet, to form a boxlike shape 19 that is open at one side. A similar box-like shape 20 of slightly larger size is formed and fitted over the member 19, as shown in Fig. 2, the member 19 being cemented to the surface of a wall or ceiling 21 and the end walls and side walls of the members 19 and 20 being cemented together. In this structure the corrugated sheets have facing sheets 22 and 23 on each side thereof instead of having only a single facing sheet as does the corrugated board of Fig. 1. The boxlike units of Fig. 2 will be assembled on a wall surface as indicated in Fig. 3.

In Fig. 4 I show a unit formed from a corrugated sheet of great width and wherein each edge portion of the sheet is folded back toward the middle thereof, and then bent to rectangular form, as indicated at 24. These rectangular portions 24 are cemented to the main body of the sheet, thus serving to stiffen and support the main body of the sheet against sagging, the unit being cemented or otherwise secured to a wall surface as indicated in Fig. 2.

The corrugated boards from which the box-like or channel units are formed as shown in Figs. 1 to 4, may be scored along only the lines at which they are to be bent, or can be scored along a great number of lines so that the workmen can readily bend them to desired sizes to fit certain areas. If the score marks or weakened lines are made in the exposed facing sheet, no harm will be done because they will produce an effect that will avoid the unpleasing appearance that is frequently found on wide flat areas, especially in that the lines will have the effect of avoiding apparent contrasts in color or shading that are difficult to prevent on wide surfaces.

In Fig. 7 I show units 26 that may be formed as shown in Fig. 1, and which contain loose fibrous material 27 such as rock wool, rag felt, exfoliated mica or the like. When fibrous filling material is employed, the corrugated board may be perforated as indicated at 28, to permit the entry of sound waves to the fibrous-filled interior of the unit.

Where certain structural designs or effects are desired, as by way of ceiling beams, columns or pilasters, the corrugated boards can conveniently be bent to form a unit such as that indicated at 29, which here simulates either a beam fastened to a ceiling or a pilaster on the side wall of the room. Circular or cylindrical structural shapes are indicated at 30. Hollow members such as 29 and 30 can be employed not only for their sound-absorbing and structural appearance, but as conduits for wires, pipes or the circulation of air in the heating or air conditioning of a building.

In Fig. 8 I show still other structural shapes, indicated by the numerals 31 and 32.

Fig. 9 shows an arrangement wherein a sheet of corrugated board scored as shown in Fig. 6, for example, may be bent to form a plurality of convex areas throughout the length of the sheet with hollow spaces 33 between such convex areas and a wall surface 34 to which the unit is secured by gluing or nailing, along the narrow flat areas 35. In this instance, as well as in the case of the other hollow or box-like structures, perforations 36 may be provided when desired, for entry of sound waves into the spaces 33.

In Fig. 10 I show a sound-absorbing unit 37 of cylindrical form, wrapped around and cemented to a solid column 38.

In Fig. 11 I show a unit which in effect constitutes two corrugated sheets 39 and 40 that are cemented together and each of which is provided with a smooth facing sheet, 41 and 42 respectively. The unit can be made either of two corrugated boards with their exposed corrugations cemented together, or can be made by folding a single sheet of corrugated board upon itself, so that the corrugated surfaces are brought into engagement with one another.

In Fig. 12 I show a unit wherein the corrugated sheet 44 has a facing sheet 45 on only one side thereof. A stiffening strip 46 of corrugated form is cemented to the corrugated sheet 44 and extends crosswise thereof, the stiffening strip being employed where there is a relatively wide expanse of corrugated board, to stiffen the mid portions of the board against sagging. Stiffening strips of other than corrugated form can of course be employed. In this structure also, I show holes or orifices 47 for the entrance of sound waves into the unit.

Referring now to Fig. 13, I show a unit comprising a corrugated facing sheet 50 having a smooth backing sheet 51 adherently connected thereto. The sheet is bent to form a series of channel-like depressions 52 that are suitably secured to the surface of a wall or ceiling 53. The units will function after the manner of diaphragms, as explained in connection with various of the other figures, and additionally there will be sound absorption in the channels 52 because sound waves that enter them will be reflected back and forth between the sides of the channels.

In Fig. 14 I show a slightly modified form of the arrangement of Fig. 13, wherein the outermost surfaces of the units are convex as shown at 54 instead of being flat, and wherein the inner portions of the unit are flattened for considerable distances as shown at 55, for attachment to a wall. The channels in this arrangement are wide relative to the channels of Fig. 13, and a different decorative effect is produced.

In Fig. 15 I show a unit which may be suspended at one end from a ceiling or side wall, or at both ends from the side walls of a room. The unit comprises a corrugated sheet 57 adhesively connected to a smooth facing sheet 58, although the corrugated sheet may be in front of instead of behind the facing sheet, as in Fig. 13. The composite sheet is bent to form channels 59 and a sheet or series of strips 60 are secured to the rear side of the unit to serve as a tie for preventing pulling or stretching of the unit to a flattened condition. A bar 61 of metal or wood is connected to the upper edge of the unit and carries a screw eye 62 or the like, whereby it can be suspended from a ceiling, with the channels 59 extending horizontally. Provision of a similar screw eye at the opposite end of the unit will permit of suspending it with the channels 59 extending vertically, or suspending the unit in a horizontal plane. This arrangement permits of moving the units to desired locations in a room, because under some conditions it may be desirable to have the location of the sound-absorbing units at places other than directly against a ceiling or side wall.

It will be understood that the units of Figs. 13 to 15 may be composed of narrow, bent strips of corrugated board instead of wide sheets.

Referring now to Fig. 16, I show a unit composed of a plurality of corrugated strips 63 which are secured at their rear edges to a sheet or series of strips 64 that are in turn connected to a suspending bar 65. The strips 63 will be flexed at their lines of juncture with the backing 64 and can thereby be located at desired angles, in accordance with the quality or character of sound absorption required. In order to render the strips adjustable, I provide cords 66 connected to the outer edges of the strips 63, which cords can be raised and lowered and tied to or wrapped around studs 67 on the bar 65. In this unit the backing 65 can either be secured to a wall or the unit can be hung anywhere in a room by the use of screw eyes 68. In this unit as in the case of Figs. 13 to 15, the corrugated strips will function to absorb sound waves and such waves will also be absorbed by reflection back and forth in the spaces between adjacent strips 63, the extent of sound absorption being dependent to a considerable extent upon the angularity of the strips 63.

In Fig. 17 I show an arrangement that functions somewhat after the manner of the units of Figs. 13 to 16 in that strips or blocks of sound-absorbing material are placed in proximity to one another so as to additionally absorb or dissipate sound waves through reflections back and forth in the spaces between the sound-absorbing strips. In this instance, the strips 70 may be of fiber board, felt or the like, and are held in relative spaced relation by cords or wires 71 and hung at desired locations in a room. In this instance, I show grooves 70a in which sound waves may be dissipated as in the case of the channels 52 of Fig. 13. It will be understood that the elements 70 can be also mounted in the same manner as the strips 63 of Fig. 16.

As in the case of Fig. 16, the elements 70 may be spaced greater or less distances, and their depth (in directions perpendicularly to the plane of the unit) may be greater than their thickness, or less, depending upon the amount of sound absorption desired in the channel-like spaces.

With further reference to the scoring of the corrugated boards in order to facilitate the bending thereof along straight lines, the scoring of a board preliminary to forming the unit of Fig. 1 will preferably be crosswise of the corrugations, at the rear side of the sheet, while scoring marks in directions parallel to the corrugations, to form the units of Figs. 7 and 8, will usually be made on the smooth outer surface of the board, particularly when a board is composed of only a corrugated sheet and a smooth facing sheet.

In the accompanying claims, the term "wall" or "wall structure" is used in a broad sense, to include not only side wall surfaces and frame elements, but also ceiling structures.

I claim as my invention:

1. The combination with a wall, of a facing therefor comprising a sound-absorbing unit of flexible corrugated boards of the type having a smooth facing sheet, one of which is secured flatwise to the outermost surface of the wall and another of which is connected to the said one board in outwardly-spaced relation thereto, throughout substantially the entire area, the said connections between the boards including marginal edge portions on one of the boards bent perpendicularly toward the other board and secured thereto.

2. The combination with a wall, of a facing therefor comprising sound-absorbing material of flexible corrugated boards of the type having a smooth facing sheet, and arranged in the form of units each of which comprises a portion disposed flatwise against the wall and secured thereto, portions carried thereby and extending perpendicularly outward therefrom, and an exposed area carried by the latter named portions and bridging the same, in outwardly-spaced relation to the first-named portion.

3. The combination with a wall, of a facing therefor comprising a sound-absorbing unit of flexible corrugated boards of the type having a smooth facing sheet, one of which is secured flatwise to the outermost surface of the wall and another of which is connected to the said one board in outwardly-spaced relation thereto, throughout substantially the entire area, the said connections between the boards including marginal edge portions on each of the boards bent perpendicularly toward the other board and secured to the said marginal edge portions of the other board.

JACOB MAZER.